United States Patent
Yoon et al.

(10) Patent No.: US 8,299,660 B2
(45) Date of Patent: Oct. 30, 2012

(54) MOTOR FIXING STRUCTURE AND MOTOR ASSEMBLY

(75) Inventors: Sang Pil Yoon, Seoul (KR); Jin Young Jeon, Hwaseong-si (KR); Yong Jae Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 244 days.

(21) Appl. No.: 12/144,005

(22) Filed: Jun. 23, 2008

(65) Prior Publication Data
US 2009/0045685 A1    Feb. 19, 2009

(30) Foreign Application Priority Data
Aug. 16, 2007    (KR) ................. 10-2007-0082267

(51) Int. Cl.
*H02K 5/24*    (2006.01)
*H02K 5/00*    (2006.01)
*H02K 5/04*    (2006.01)

(52) U.S. Cl. ................. 310/51; 310/89; 310/91

(58) Field of Classification Search .......... 310/51, 310/89, 91; *H02K 5/24, 5/00, 5/04*
See application file for complete search history.

(56) References Cited

U.S. PATENT DOCUMENTS

| 4,155,529 | A | * | 5/1979 | Maudlin | 417/363 |
| 5,126,607 | A | | 6/1992 | Merriman, Jr. | |
| 6,408,863 | B1 | * | 6/2002 | Owczarz | 134/140 |
| 2002/0195132 | A1 | * | 12/2002 | Owczarz | 134/140 |
| 2007/0188027 | A1 | * | 8/2007 | Sakamaki et al. | 310/51 |
| 2009/0179513 | A1 | * | 7/2009 | Cho et al. | 310/91 |

FOREIGN PATENT DOCUMENTS

JP    5-340444    12/1993
KR    2004-41395    5/2004

OTHER PUBLICATIONS

Chinese Office Action dated Aug. 23, 2010 issued in CN200810215468.2.
CN Office Action issued Mar. 29, 2011 in CN Application 200810215467.2.

* cited by examiner

*Primary Examiner* — Quyen Leung
*Assistant Examiner* — Michael Andrews
(74) *Attorney, Agent, or Firm* — Stanzione & Kim, LLP

(57) ABSTRACT

A motor fixing structure and a motor assembly capable of reducing vibration of a motor and also maintaining a compact configuration. The motor assembly includes a motor, a fixing member disposed to be spaced from the motor by a predetermined spacing distance, and a vibration absorbing member to prevent vibration of the motor from being transferred to the fixing member, wherein the vibration absorbing member is formed to be longer by a predetermined specified length than the predetermined spacing distance between the motor and the fixing member and is disposed outside of a periphery of the motor.

12 Claims, 8 Drawing Sheets

MOTOR FIXING STRUCTURE AND MOTOR ASSEMBLY

CROSS-REFERENCE TO RELATED APPLICATIONS

This application claims the benefit and priority under 35 U.S.C. §119(a) of Korean Patent Application No. 2007-0082267, filed on Aug. 16, 2007 in the Korean Intellectual Property Office, the disclosure of which is incorporated herein by reference in its entirety.

BACKGROUND OF THE INVENTION

1. Field of the Invention

The present general inventive concept relates to a motor fixing structure and a motor assembly, and, more particularly, to a motor fixing structure and a motor assembly capable of preventing vibration of a motor from being transferred to an external structure.

2. Description of the Related Art

In general, a motor is a device which generates a driving force based on a magnetic interaction caused by electrical energy applied from an outside source. The motor is used as a driving force generating means in various industrial facilities and household equipment. As the use of the motor increases, various devices have been developed to improve accompanying problems of the motor.

The motor, which is installed at a cooling and heating device, a printer or the like, is fixed and installed at a proper position to achieve a certain object. Generally, the motor is fixed on a bracket to configure a motor assembly.

A conventional motor is fixed to a main structure with a number of bolts and nuts. A vibration absorbing member made of a rubber material or the like is inserted between the main structure and the motor to absorb the vibration of the motor rotating at a high speed.

However, in the above structure, a portion of the vibration of the motor is transferred to the main structure through fixing bolts and fixing nuts, thereby causing a problem such that vibration absorption is not perfectly made.

In order to solve the problem, the vibration absorbing member should be formed to have a length longer than a specified length to prevent the vibration of the motor from being transferred to the main structure. However, as the length of the vibration absorbing member increases, the size of the motor assembly increases. Accordingly, it is difficult that the motor assembly is applied to products such as a printer required to be compact.

Further, when the vibration absorbing member has a long length, it is possible to prevent the vibration of the motor from being transferred to the main structure to a certain extent, but the motor is not firmly fixed. Accordingly, a rotation shaft of the motor is irregularly rotated in the rotation of the motor, thereby causing problems such as an increase in noise or a reduction of the life span of a component of the motor or a mechanism attached to the motor.

SUMMARY OF THE INVENTION

The present general inventive concept provides a motor fixing structure and a motor assembly capable of reducing vibration of a motor and also maintaining a compact configuration.

The present general inventive concept also provides a motor fixing structure and a motor assembly capable of reducing vibration of a motor and also firmly fixing the motor in place.

Additional aspects and/or advantages of the present general inventive concept will be set forth in part in the description which follows and, in part, will be obvious from the description, or may be learned by practice of the general inventive concept.

The foregoing and/or other aspects and utilities of the present general inventive concept may be achieved by providing a motor assembly including a motor, a fixing member disposed to be spaced apart from the motor by a predetermined spacing distance, and a vibration absorbing member to prevent vibration of the motor from being transferred to the fixing member, wherein the vibration absorbing member is formed to be longer by a predetermined length than the predetermined spacing distance between the motor and the fixing member and is disposed at an outside of a periphery of the motor.

The motor assembly may further include an auxiliary fixing member having a stepped portion to couple together the motor and the vibration absorbing member, wherein the motor is fixed to a lower surface of the auxiliary fixing member and the vibration absorbing member is coupled to the stepped portion disposed on an upper surface of the auxiliary fixing member.

The motor assembly may further include a first auxiliary fixing member coupled to the motor and a second auxiliary fixing member to couple the first auxiliary fixing member together with the fixing member.

The vibration absorbing member may be disposed between the first auxiliary fixing member and the second auxiliary fixing member.

The vibration absorbing member may be disposed between the second auxiliary fixing member and the fixing member.

The motor may include a flange portion formed to be coupled to the vibration absorbing member. The flange portion may be disposed at an upper peripheral portion of the motor.

The fixing member may include a shaft hole to receive a rotation shaft of the motor.

The fixing member may include a gear fixing portion formed to rotatably fix a gear which is gear coupled to a rotation shaft of the motor.

The vibration absorbing member may include a fastening hole to couple screws.

A reinforcing member may be inserted into the fastening hole to reinforce a clamping force of the vibration absorbing member.

The foregoing and/or other aspects and utilities of the present general inventive concept may also be achieved by providing a motor fixing structure including a motor, a fixing member to fix the motor in position, and a vibration absorbing member to prevent vibration of the motor from being transferred to the fixing member, wherein the vibration absorbing member is formed to have a predetermined length and is disposed at a periphery of the motor.

The vibration absorbing member may have a length longer than a predetermined spacing distance between the motor and the fixing member.

The vibration absorbing member may have a plurality of fastening holes disposed at each of opposite sides thereof, and the vibration absorbing member may be screw coupled to the motor through a plurality of fastening holes disposed at one side of the vibration absorbing member and is screw coupled to the fixing member through a plurality of fastening holes disposed at the opposite side of the vibration absorbing member.

The foregoing and/or other aspects and utilities of the present general inventive concept may also be achieved by providing a motor assembly, including a motor, first and second fixing members such that the first fixing member is attached directly to a first side of the motor, a plurality of vibration absorbing members disposed between and attached to the first and second fixing members such that a first end of each of the plurality of vibration absorbing members is attached to the first fixing member and a second end of each of the plurality of vibration absorbing members is attached to the second fixing member at a location which is a predetermined distance from the motor.

A rotation shaft may protrude through an opening in the second fixing member.

The motor assembly may further include at least one connecting portion attached to the first fixing member having a length substantially equal to a distance between the first fixing member and the second fixing member and on which one of the plurality of vibration absorbing members is disposed.

The motor assembly may further include at least one connecting portion attached to the second fixing member having a length substantially equal to a distance between the first fixing member and the second fixing member and on which one of the plurality of vibration absorbing members is disposed.

Each of the first ends of the plurality of vibration absorbing members may be attached to the first side of the motor at a respective flange disposed on a periphery of the first side of the motor.

Each of the first ends of the plurality of vibration absorbing members may be attached to a stepped portion of the first fixing member.

BRIEF DESCRIPTION OF THE DRAWINGS

These and/or other aspects and utilities of the present general inventive concept will become apparent and more readily appreciated from the following description of the embodiments, taken in conjunction with the accompanying drawings, of which.

DETAILED DESCRIPTION OF THE PREFERRED EMBODIMENTS

Figure 1:
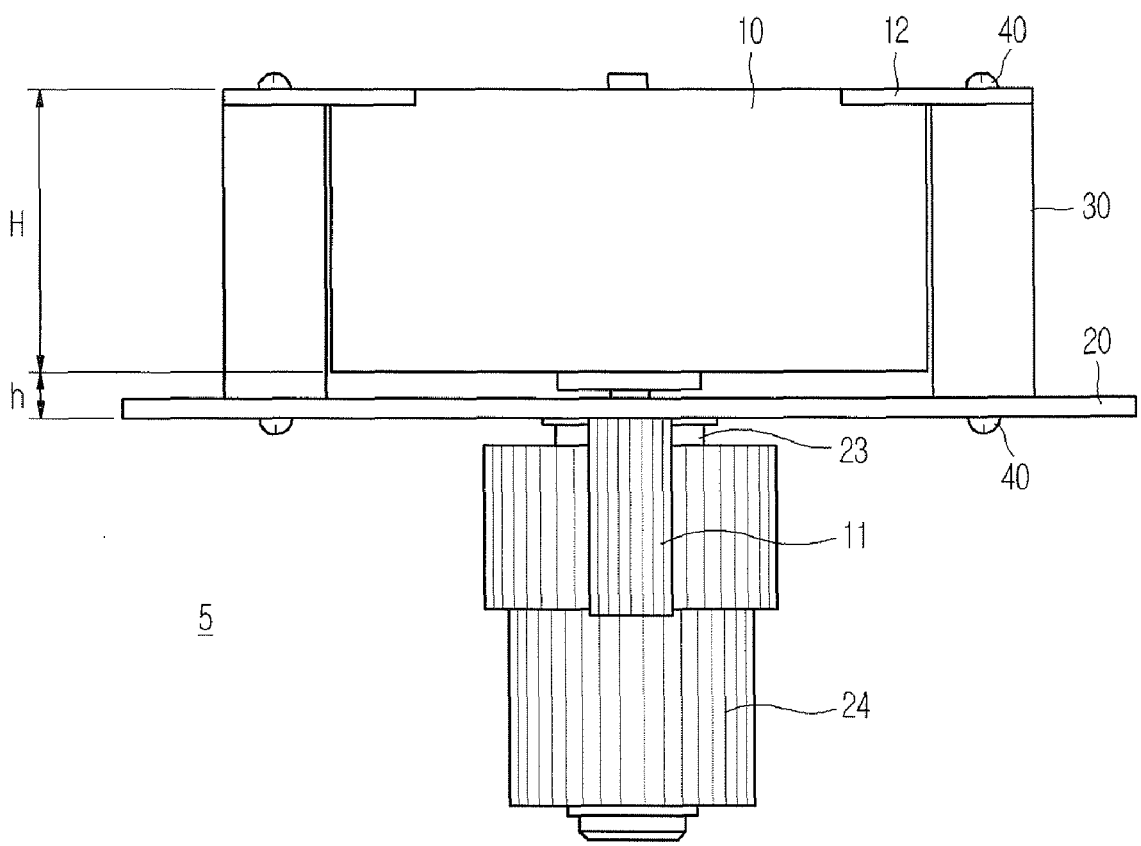
FIG. 1 illustrates a front view illustrating a motor assembly according to an embodiment of the present general inventive concept.

Reference will now be made in detail to exemplary embodiments of the present general inventive concept, examples of which are illustrated in the accompanying drawings, wherein like reference numerals refer to like elements throughout. The embodiments are described below to explain the present general inventive concept by referring to the figures.

Hereinafter, embodiments of the present general inventive concept will be described in detail with reference to the accompanying drawings.

Figure 2:
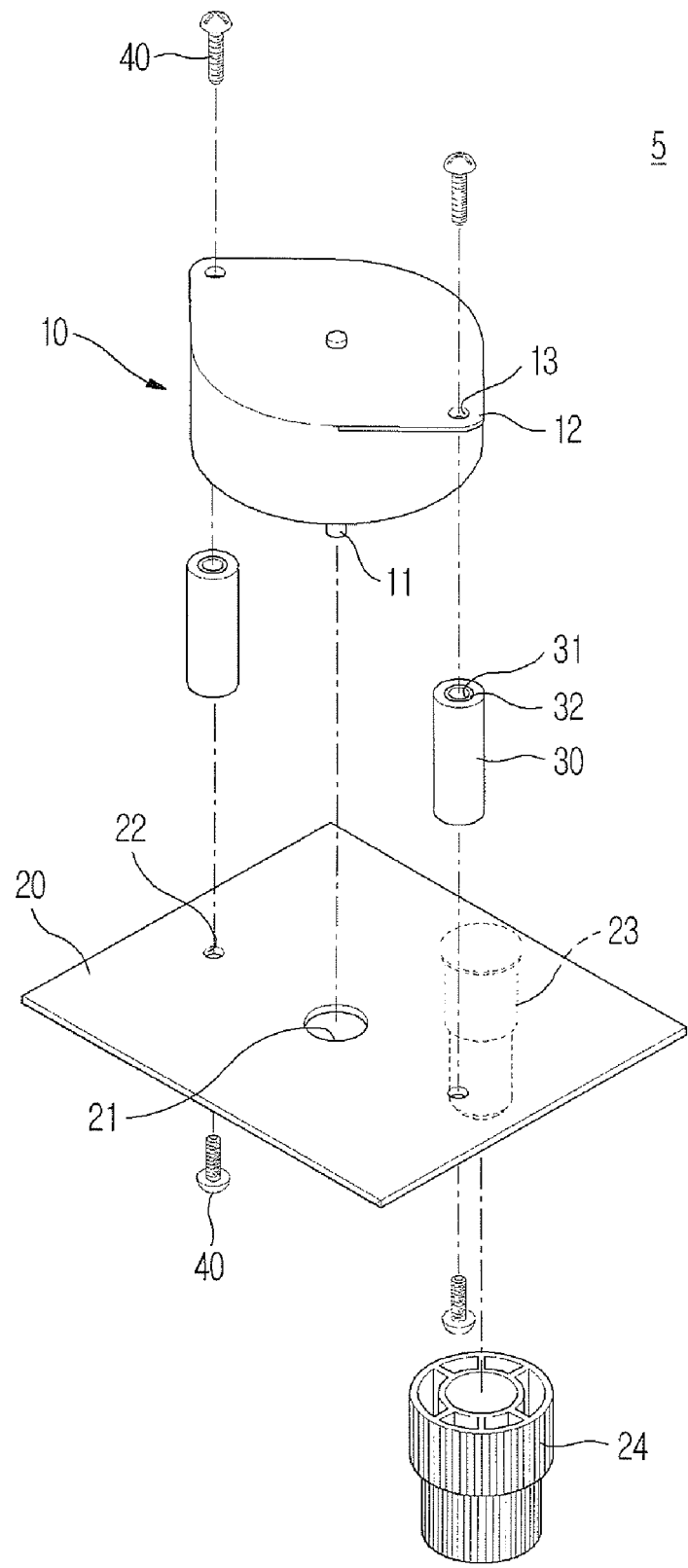
FIG. 2 illustrates an exploded perspective view illustrating the motor assembly according to an embodiment of the present general inventive concept.

FIG. 1 illustrates a front view illustrating a motor assembly according to an embodiment of the present general inventive concept. FIG. 2 illustrates an exploded perspective view illustrating the motor assembly according to this embodiment of the present general inventive concept.

As illustrated in FIGS. 1 and 2, the motor assembly 5 according to this embodiment of the present general inventive concept includes a motor 10, a fixing member 20 to fix the motor 10, and vibration absorbing members 30 which are disposed between the motor 10 and the fixing member 20 to prevent the vibration of the motor 10 from being transferred to the fixing member 20.

In the present general inventive concept, various motors capable of generating the vibration in the operation may be used as the motor 10. The following description is made using a step motor, as an example, as the motor 10.

The step motor is a digital actuator which rotates by a predetermined angle of rotation, wherein a rotor can be rotated by a predetermined angle of rotation for each input pulse of a control signal provided from an outside source, such as, for example, a controller (not illustrated). The step motor has a shape proper for automatic control to be mainly used as a component of a larger apparatus, such as being used as a joint mechanism of an industrial robot, a printer and the like (not illustrated). In the step motor, since an output shaft, which may be a rotation shaft 11, is rotated only by an angle of rotation which is proportional to the number of pulse signals received by the step motor, feedback information of the position of the output shaft is not necessary, which is different than determining a position of an output shaft of a conventional DC motor. Since torque is programmable, and is easily controlled and formed, the step motor has a self-positioning capability of the output shaft without a need for a brake mechanism.

However, vibration due to an imbalance between a rotational force and an inertial force of the rotor of the step motor according to the step angle of rotation in the operation of the step motor can be transferred through an external structure (not illustrated) mounted with the motor, thereby amplifying vibration, and a vibration sound, of the motor 10. Thus, in the present general inventive concept, vibration absorbing members 30 are mounted between the fixing member 20, to which the motor 10 is fixed, and the motor 10 to prevent the vibration of the motor 10 from being transferred to the external structure.

In this embodiment, the rotation shaft 11 may be disposed to protrude from one side of the motor 10, and a pair of flange portions 12 to fix the motor 10 is formed at an upper portion of the motor 10 such that two flange portions are disposed at opposite ends of a same side of the motor 10. First screw holes 13 are formed on the flange portions 12, respectively, such that the screws 40 can be fastened thereto. Accordingly, the vibration absorbing members 30 and the motor 10 can be coupled to each other using the screws 40.

The fixing member 20 includes a shaft hole 21 which is formed at a location of the fixing member 20 corresponding to the location of the rotation shaft 11 such that the rotation shaft 11 of the motor 10 can pass through the shaft hole 21 and a plurality of second screw holes 22 which is disposed such that the screws 40 can be fastened thereto.

Further, a gear fixing portion 23 may be disposed to protrude downward from a bottom surface of the fixing member 20 to rotatably fix a gear 24 which is gear coupled to the rotation shaft 11 of the motor 10.

The vibration absorbing members 30 are disposed between the motor 10 and the fixing member 20 to prevent a vibration of the motor 10 from being transferred to the fixing member 20. The vibration absorbing members 30 are formed to have a length longer by a predetermined length h than a height H of the motor 10 measured from the flange portions 12 to an end of the motor 10 which includes the rotation shaft 11 such that the motor 10 is spaced apart from the fixing member 20 by the distance h. Accordingly, it is possible to prevent the vibration of the motor 10 from being transferred to the fixing member 20, which would occur if the motor 10 and the fixing member 20 were in direct contact with each other.

The vibration absorbing members 30 can be formed in an approximately cylindrical shape and include fastening holes 31 which are respectively formed on upper and lower end surfaces thereof such that the screws 40 can be fastened thereto. In this embodiment, in order to reinforce a clamping strength in the fastening of the screws 40, reinforcing members 32 having greater strength than the vibration absorbing members 30 may be inserted into the fastening holes 31 to improve a screw clamping force when the screws 40 are screwed into reinforcing members 32 of the fastening holes 31.

In this case, as the length of the vibration absorbing members 30 increases, an effect of preventing the vibration of the motor from being transferred to the fixing member 20 is improved. In the present general inventive concept, the vibration absorbing members 30 have a predetermined specified length capable of fastening the screws 40 through the fastening holes 31 at upper and lower ends. If a vibration absorbing member 30 having a long length is coupled to a front side of the motor 10 and fixed to the fixing member 20 directly, as in the conventional technology, the size of the motor assembly 5 necessarily increases. Accordingly, in the present general inventive concept, the vibration absorbing members 30 are fixed on a peripheral side of the motor 10 to prevent an increase in the size of the motor assembly 5.

Thus, in this embodiment of the present general inventive concept having the above-described configuration, the vibration absorbing members 30 are disposed between the flange portions 12 formed at an upper peripheral side of the motor 10 and the fixing member 20. Then, after the first screw holes 13 are made to communicate with the fastening holes 31 disposed at an upper end portion of the vibration absorbing members 30, they are fastened to each other using the screws 40.

Thereafter, the second screw holes 22 of the fixing member 20 are made to communicate with the fastening holes 31 disposed at an opposite end portion of the vibration absorbing members 30, and the vibration absorbing members 30 and the fixing member 20 are also fastened to each other using the screws 40.

Since, in this embodiment, the motor 10 is fixed using the above configuration, the motor 10 and the fixing member 20 are not in direct contact with each other and are spaced apart from each other by a predetermined specified distance and, at the same time, the vibration absorbing members 30 are disposed on side surfaces of the motor 10. Accordingly, it is possible to prevent the vibration of the motor 10 from being transferred to the fixing member 20 and to allow the motor assembly 5 to have a compact size.

Next, a motor assembly according to another embodiment of the present general inventive concept is described.

Figure 3:
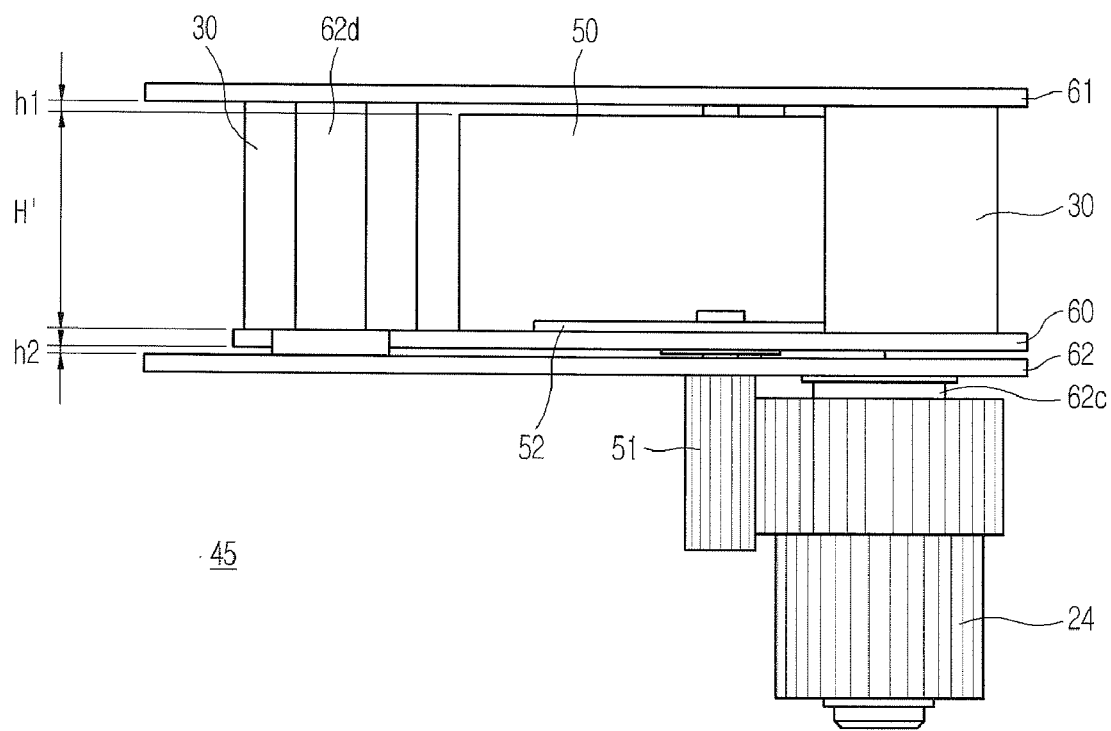
FIG. 3 illustrates a front view illustrating a motor assembly according to an embodiment of the present general inventive concept.
Figure 4:
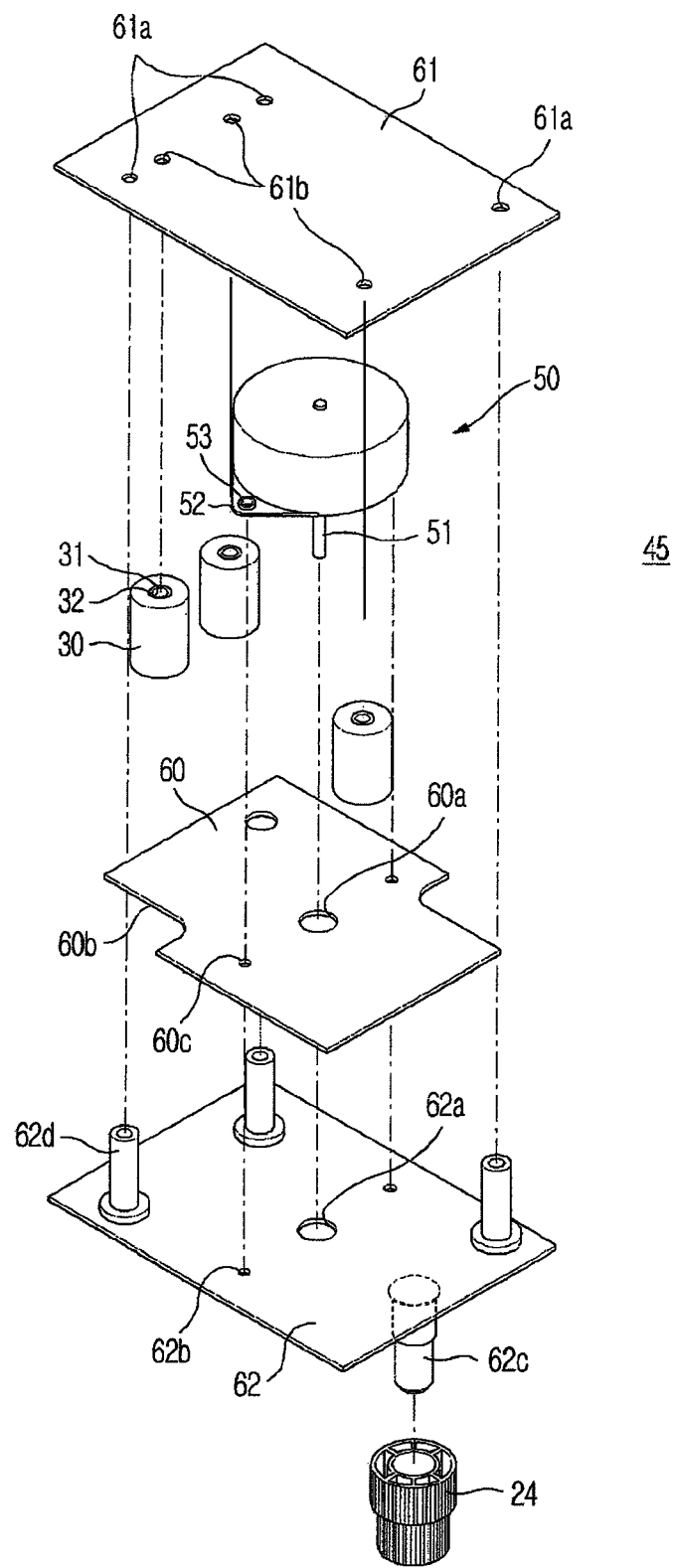
FIG. 4 illustrates an exploded perspective view illustrating the motor assembly according to an embodiment of the present general inventive concept.

FIG. 3 illustrates a front view illustrating a motor assembly 45 according to another embodiment of the present general inventive concept. FIG. 4 illustrates an exploded perspective view illustrating the motor assembly 45 according to this embodiment of the present general inventive concept.

As illustrated in FIGS. 3 and 4, the motor assembly 45 according to this embodiment of the present general inventive concept includes a motor 50, a first auxiliary fixing member 60 which is coupled to the motor 50, a second auxiliary fixing member 61 which is spaced apart from the motor 50 by a predetermined specified distance and is coupled to the first auxiliary fixing member 60, a fixing member 62 which is spaced apart from the first auxiliary fixing member 60 by a predetermined specified distance and is coupled to the second auxiliary fixing member 61, and vibration absorbing members 30 to prevent the vibration of the motor 50 from being transferred to the fixing member 62.

A rotation shaft 51 may be disposed to protrude from a lower portion of the motor 50. A pair of flange portions 52 to fix the motor 50 is formed at a lower peripheral side of the motor 50 at opposite ends with respect to each other to protrude in a radial direction away from the motor 50. Screw holes 53 are formed on each of the flange portions 52 such that screws (not illustrated) can be fastened thereto. Accordingly, the motor 50 is coupled to the first auxiliary fixing member 60 using the screws (not illustrated).

The vibration absorbing members 30 can be formed in an approximately cylindrical shape and include fastening holes 31 which are respectively formed on upper and lower end surfaces thereof such that the screws can be fastened thereto. Similar to the embodiment described above, In this embodiment, reinforcing members 32 may be inserted into the fastening holes 31 to improve a screw clamping force.

The first auxiliary fixing member 60 may include a first shaft hole 60a which is formed at a location of the first auxiliary fixing member 60 corresponding to the location of the rotation shaft 51 such that the rotation shaft 51 of the motor 50 can pass through the first shaft hole 60a. The first auxiliary fixing member 60 may further include a plurality of first screw holes 60c corresponding to the screw holes 53 such that screws (not illustrated) can be fastened thereto.

The first auxiliary fixing member 60 may further include cutaway portions 60b such that connecting portions 62d of the fixing member 62, described below, are not in direct contact with the first auxiliary fixing member 60.

The second auxiliary fixing member 61 is coupled to the first auxiliary fixing member 60 by the vibration absorbing members 30. The second auxiliary fixing member 61 may include second screw holes 61b which are formed corresponding to the location of fastening holes 31 disposed at the upper end portions of the vibration absorbing members 30. The second auxiliary fixing member 61 may further include third screw holes 61a, to couple with the fixing member 62, which are formed corresponding to the location of connecting portions 62d of the fixing member 62, described below.

The vibration absorbing members 30 may have a length longer by a predetermined specified length than a height H' of the motor such that the second auxiliary fixing member 61 is fixed while being spaced apart from the motor 50 by a predetermined specified distance h1. Accordingly, it is possible to prevent the motor 50 from being directly in contact with the second auxiliary fixing member 61.

The fixing member 62 is disposed below the first auxiliary fixing member 60 to be spaced apart from the first auxiliary fixing member 60 by a predetermined specified distance.

The fixing member 62 may include a second shaft hole 62a which is formed thereon at a position corresponding to the location of the rotation shaft 51 such that the rotation shaft 51 of the motor 50 can pass through the second shaft hole 62a. A gear fixing portion 62c may be disposed to protrude downward from a bottom surface of the fixing member 62 to rotatably fix a gear 24 which is gear coupled to the rotation shaft 51 of the motor 50.

A plurality of connecting portions 62d may be formed to protrude upward from the fixing member 62 such that the fixing member 62 can be coupled to the second auxiliary fixing member 61.

In this embodiment, the connecting portions 62d have a length longer by a predetermined specified length than the length of the vibration absorbing members 30 such that the first auxiliary fixing member 60 is spaced apart from the fixing member 62 by a predetermined specified distance h2.

Thus, since the motor 50 is coupled to the first auxiliary fixing member 60 and spaced apart by predetermined specified distances from the second auxiliary fixing member 61 and the fixing member 62 by the vibration absorbing members 30 and the connecting portions 62d, it is possible to prevent the vibration of the motor 50 from being transferred to the fixing member 62.

In this embodiment of the present general inventive concept having the above described configuration, the flange portions 52 of the motor 50 and the first auxiliary fixing member 60 are screw coupled and fixed to each other. The lower ends of the vibration absorbing members 30 are screw coupled to the first auxiliary fixing member 60 at the outside of the periphery of the motor 50, and the upper ends of the vibration absorbing members 30 are screw coupled to the second auxiliary fixing member 61 using the vibration absorbing members 30. Accordingly, the second auxiliary fixing member 61 is spaced apart from the motor 50 by a predetermined specified distance to be fixed to the upper side of the motor 50.

The connecting portions 62d of the fixing member 62 are screw coupled to the second auxiliary fixing member 61 such that the fixing member 62 is fixed while being spaced apart from the first auxiliary fixing member 60 by a predetermined specified distance. The fixing member 62 may further include fourth screw holes 62b to be screw coupled with the first screw holes 60c of the first auxiliary fixing member 60. Accordingly, it is possible to prevent the vibration of the motor 50 from being transferred to the fixing member 62, to allow the motor assembly 45 to have a compact size, and also to firmly fix the motor 50 in position.

Next, a motor assembly 47 according to a further embodiment of the present general inventive concept is described.

Figure 5:
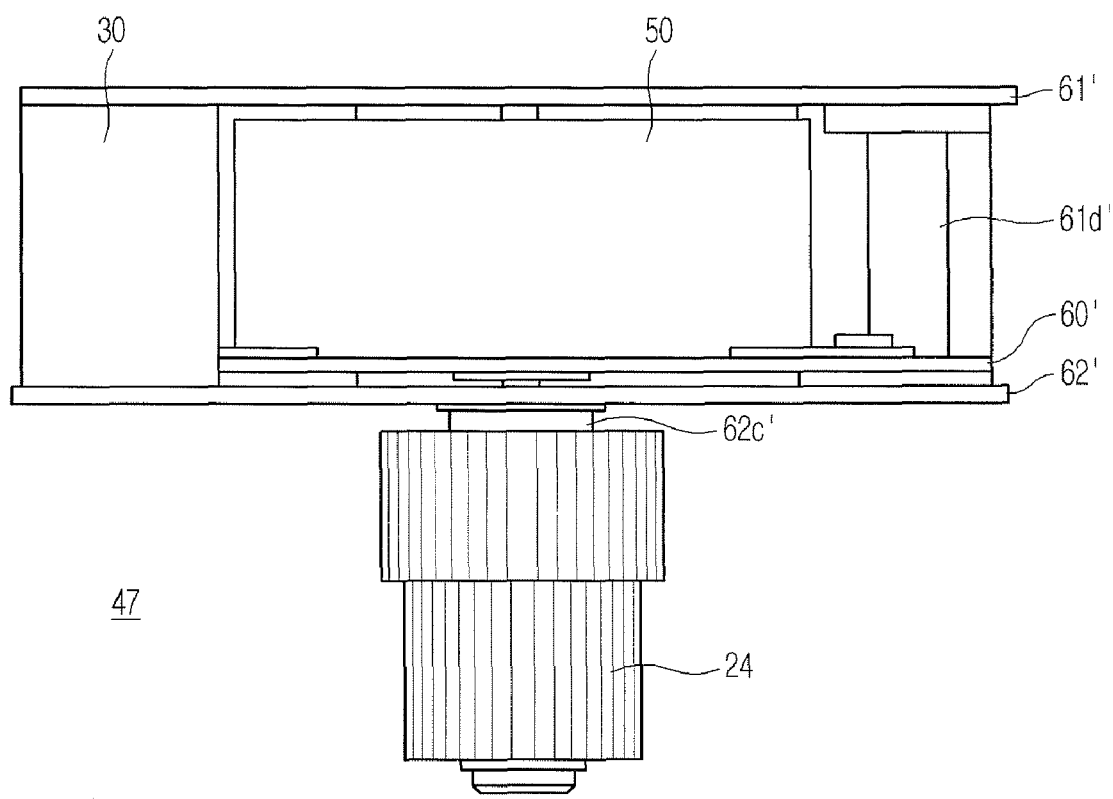
FIG. 5 illustrates a front view illustrating a motor assembly according to an embodiment of the present general inventive concept.
Figure 6:
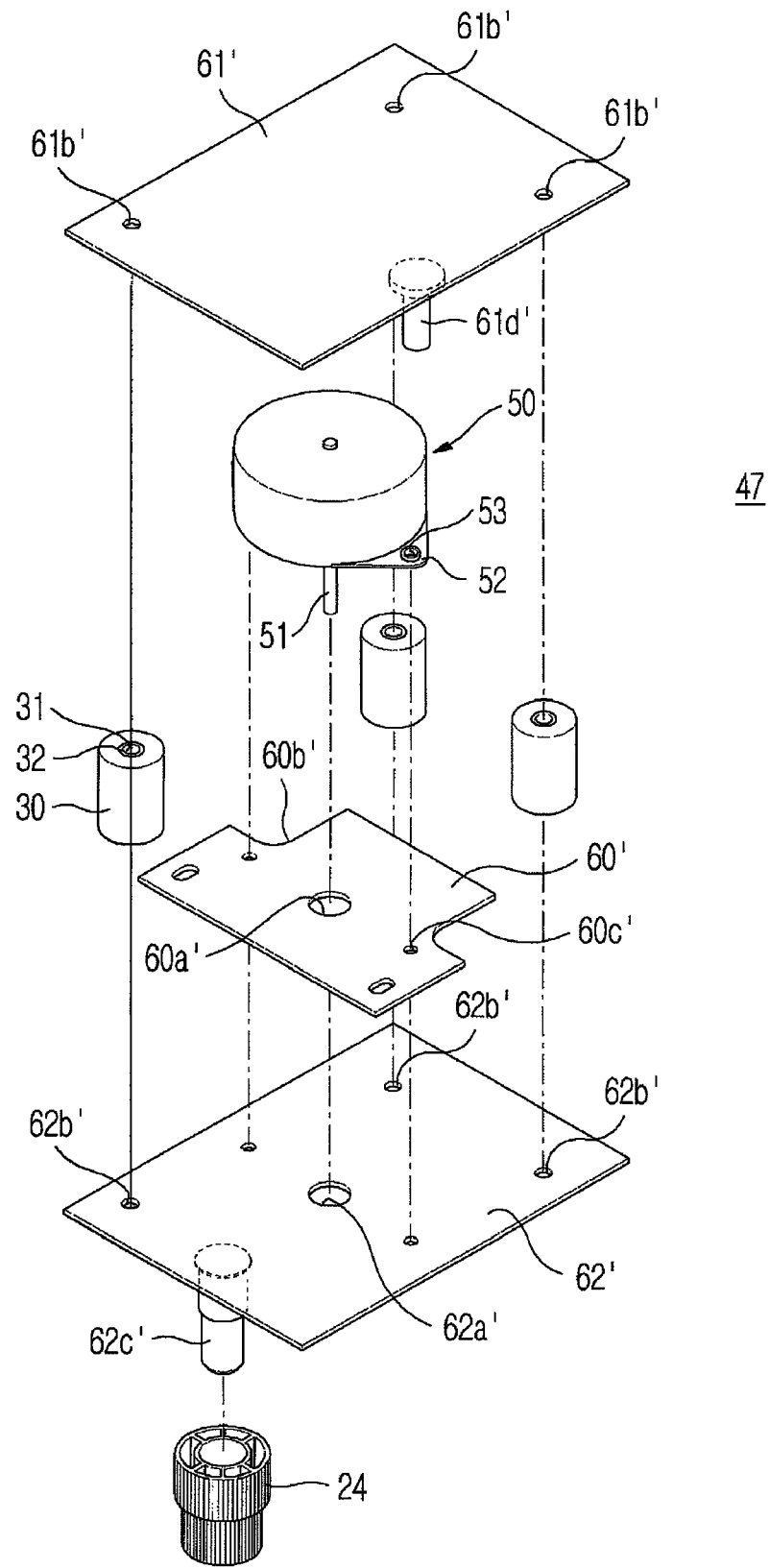
FIG. 6 illustrates an exploded perspective view illustrating the motor assembly according to an embodiment of the present general inventive concept.

FIG. 5 illustrates a front view illustrating a motor assembly 47 according to a further embodiment of the present general inventive concept. FIG. 6 illustrates an exploded perspective view illustrating the motor assembly 47 according to this embodiment of the present general inventive concept.

Since the motor assembly 47 according to this embodiment of the present general inventive concept is similar to the motor assembly 45 according to the above-described embodiment, the same configurations as in the above-described embodiment having the motor assembly 45 are designated in this embodiment by the same reference numerals and the description given above for those same configurations is incorporated herein for the description of this embodiment.

As illustrated in FIGS. 5 and 6, the motor assembly 47 according to this embodiment of the present general inventive concept includes a motor 50, a first auxiliary fixing member 60' which is coupled to the motor 50, a second auxiliary fixing member 61' which is spaced apart from the motor 50 by a predetermined specified distance and is coupled to the first fixing member 60', a fixing member 62' which is spaced apart from the first auxiliary fixing member 60' by a predetermined specified distance and is coupled to the second auxiliary fixing member 61', and vibration absorbing members 30 to prevent the vibration of the motor 50 from being transferred to the fixing member 62'.

The first auxiliary fixing member 60' may include a first shaft hole 60a' which is formed at a position corresponding to a location of the rotation shaft 51 of the motor 50 such that the rotation shaft 51 can pass through the first shaft hole 60a', and a plurality of first screw holes 60c' corresponding to screw holes 53 such that screws (not illustrated) can be fastened thereto.

The first auxiliary fixing member 60' may include cutaway portions 60b' such that the vibration absorbing members 30 are not in direct contact with the first auxiliary fixing member 60'.

The second auxiliary fixing member 61' is coupled to the first auxiliary fixing member 60'. A connecting portion 61d' may be disposed on a bottom surface of the second auxiliary fixing member 61' to be disposed to protrude toward the first auxiliary fixing member 60'. Further, second screw holes 61b' to couple with the vibration absorbing members 30 may be disposed on the second auxiliary fixing member 61'.

Thus, the connecting portion 61d' may be screw coupled to the first auxiliary fixing member 60' to couple together the first and second auxiliary fixing members 60' and 61'.

In this embodiment, the connecting portion 61d' is formed to have a length longer by a predetermined specified length than the height of the motor 50 such that the second auxiliary fixing member 61' is spaced apart from the motor 50.

The second auxiliary fixing member 61' may be coupled to the fixing member 62' using the vibration absorbing members 30. In the same way as in the above-described embodiment having the motor assembly 45, the vibration absorbing members 30 are disposed at the outside of a periphery of the motor 50.

The fixing member 62' may include a second shaft hole 62a' which is formed at a position thereon corresponding to the location of the rotation shaft 51 such that the rotation shaft 51 of the motor 50 can pass through the second shaft hole 62a'. A gear fixing portion 62c' may be disposed to protrude downward from a bottom surface of the fixing member 62' to rotatably fix a gear 24 which is gear coupled to the rotation shaft 51 of the motor 50. The fixing member 62' may further include third screw holes 62b' which are formed thereon corresponding to fastening holes 31 disposed at a lower end of the vibration absorbing members 30.

In this embodiment, the vibration absorbing members 30 have a length longer by a predetermined specified length than a length of the connecting portion 61d' such that the first auxiliary fixing member 60' and the fixing member 62' can be spaced apart from each other by a predetermined specified distance. Accordingly, it is possible to prevent the fixing member 62' from being in direct contact with the first auxiliary fixing member 60'.

In this embodiment of the present general inventive concept having the above configuration, flange portions 52 of the motor 50 are screw coupled and fixed to the first auxiliary fixing member 60'. The first and second auxiliary fixing members 60' and 61' are screw coupled to each other using the connecting portion 61d'. The vibration absorbing members 30 are disposed at the outside of the periphery of the motor 50. The upper ends of the vibration absorbing members 30 are screw coupled to the second auxiliary fixing member 61' and the lower ends of the vibration absorbing members 30 are screw coupled to the fixing member 62', thereby completing a motor fixing structure of the motor 47.

Thus, it is possible to allow the motor assembly 47 to have a compact size, to prevent the vibration of the motor 50 from being transferred to the fixing member 62', and also to firmly fix the motor 50 in position.

Figure 7:
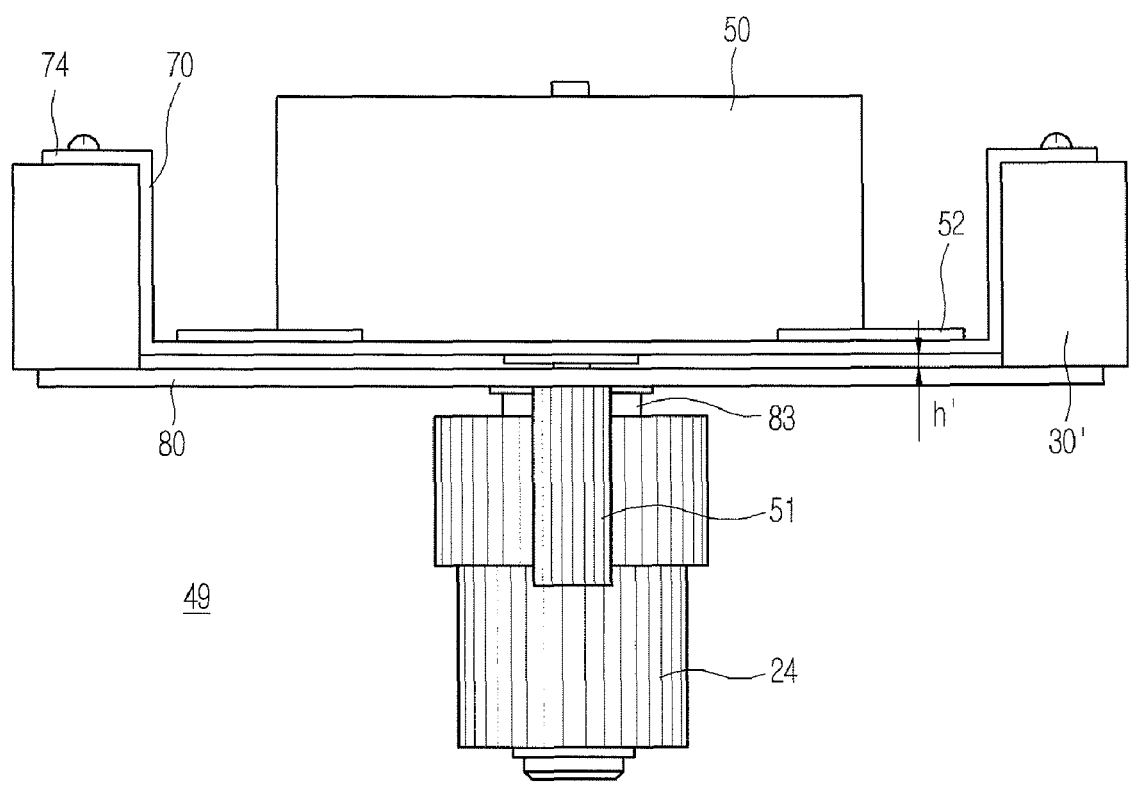
FIG. 7 illustrates a front view illustrating a motor assembly according to an embodiment of the present general inventive concept.
Figure 8:
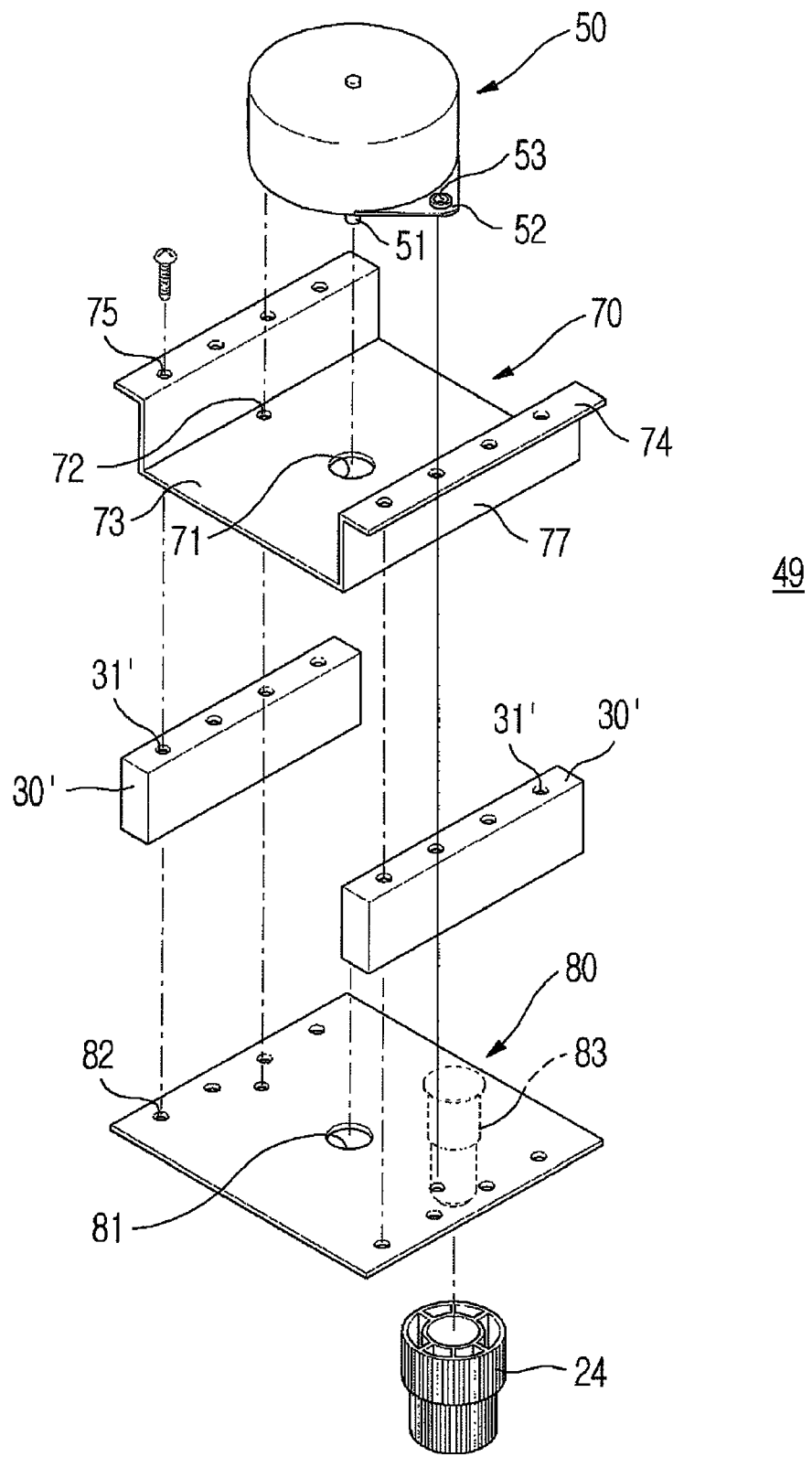
FIG. 8 illustrates an exploded perspective view illustrating the motor assembly according to an embodiment of the present general inventive concept.

As illustrated in FIGS. 7 and 8, a motor assembly 49 according to an additional embodiment of the present general inventive concept includes a motor 50, an auxiliary fixing member 70 which is coupled to the motor 50, a fixing member 80 which is spaced apart from the motor 50 by a predetermined specified distance and is coupled to the auxiliary fixing member 70, and vibration absorbing members 30' disposed between the auxiliary fixing member 70 and the fixing member 80 to prevent the vibration of the motor 50 from being transferred to the fixing member 80.

The auxiliary fixing member 70 may include a first shaft hole 71 which is formed at a position thereon corresponding to a location of the rotation shaft 51 of the motor 50 such that the rotation shaft 51 can pass through the first shaft hole 71, and a plurality of first screw holes 72 corresponding to screw holes 53 such that screws (not illustrated) can be fastened thereto.

The auxiliary fixing member 70 may include a pair of stepped portions 74 at the edge side thereof, each of which is disposed on an upper portion of a wall 77, which extends upwards from a bottom portion 73 of the auxiliary fixing member 70, and is parallel to the bottom portion 73 of the auxiliary fixing member 70. Second screw holes 75 are formed on the stepped portions 74 to enable screw coupling with the vibration absorbing members 30'. The motor 50 is screw coupled to an upper surface of the bottom portion 73 of the auxiliary fixing member 70, and the vibration absorbing members 30' are screw coupled to lower surfaces of the stepped portions 74.

In this embodiment, the vibration absorbing members 30' may be formed in various shapes, for example, a cylindrical shape as in the other embodiments, or in an approximately rectangular shape, and may include a plurality of fastening holes 31' which are respectively formed at upper and lower portions of the absorbing members 30' such that screws can be fastened thereto.

In order to reinforce a clamping strength in the fastening of the screws, reinforcing members (not illustrated) having a greater strength than the vibration absorbing members 30' may be inserted into the fastening holes 31' to improve a screw clamping force.

The vibration absorbing members 30' may be formed to have a length longer by a predetermined specified length h' than a height of the stepped portions 74 such that the bottom portion 73 on which the motor 50 is fixed is spaced apart from the fixing member 80. Accordingly, it is possible to prevent the vibration of the motor 50 from being transferred to the fixing member 80.

The vibration absorbing members 30' may be disposed at the outside of a periphery of the motor 50, thereby allowing the motor assembly 49 to have a small profile.

The fixing member 80 may include a second shaft hole 81 which is formed at a position thereon corresponding to the location of the rotation shaft 51 such that the rotation shaft 51 of the motor 50 can pass through the second shaft hole 81. The fixing member 80 may further include a plurality of third screw holes 82 formed thereon corresponding to the location of the second screw holes 75 of the auxiliary fixing member 70. A gear fixing portion 83 may be disposed to protrude downward from a bottom surface of the fixing member 80 to rotatably fix a gear 24 which is gear coupled to the rotation shaft 51 of the motor 50.

In this embodiment, flange portions 52 of the motor 50 may be screw coupled to the auxiliary fixing member 70. The upper surfaces of the vibration absorbing members 30' may be screw coupled to the lower surfaces of the stepped portions 74 of the auxiliary fixing member 70, and the lower surfaces of the vibration absorbing members 30' may be screw coupled to the upper surface of the fixing member 80, thereby completing a motor fixing structure of the motor assembly 49.

Thus, in the motor assembly 49 according to the present general inventive concept, it is possible to allow the motor assembly 49 to have a compact size, to prevent the vibration of the motor 50 from being transferred to the fixing member 80, and also to firmly fix the motor 50 in position.

As described above, in the motor assembly and the motor fixing structure according to the present general inventive concept, vibration absorbing members are disposed at the outside of a periphery of the motor. Accordingly, a vibration of the motor is prevented from being transferred to the motor fixing structure and the motor assembly has a compact size.

Further, since the motor may be fixed in position using an auxiliary fixing member, the present general inventive concept has an effect of firmly fixing the motor.

Although a few embodiments of the present general inventive concept have been illustrated and described, it would be appreciated by those skilled in the art that changes may be made in these embodiments without departing from the principles and spirit of the general inventive concept, the scope of which is defined in the appended claims and their equivalents.

What is claimed is:

1. A motor assembly, comprising:
    a motor;
    a fixing member disposed to be spaced apart from the motor by a predetermined spacing distance; and
    a vibration absorbing member to prevent vibration of the motor from being transferred to the fixing member,
    wherein the vibration absorbing member is formed to be longer by a predetermined length than the height of the motor and is disposed at an outside of a periphery of the motor, and
    wherein the vibration absorbing member includes a fastening hole through the length of the vibration absorbing member to couple screws, and a reinforcing member is inserted into the fastening hole to reinforce a clamping force of the vibration absorbing member.

2. The motor assembly according to claim 1, further comprising:
    an auxiliary fixing member having a stepped portion to couple together the motor and the vibration absorbing member, wherein the motor is fixed to a lower surface of the auxiliary fixing member and the vibration absorbing member is coupled to the stepped portion disposed on an upper surface of the auxiliary fixing member.

3. The motor assembly according to claim 1, further comprising:
    a first auxiliary fixing member coupled to the motor and a second auxiliary fixing member to couple the first auxiliary fixing member together with the fixing member.

4. The motor assembly according to claim 3, wherein the vibration absorbing member is disposed between the first auxiliary fixing member and the second auxiliary fixing member.

5. The motor assembly according to claim 3, wherein the vibration absorbing member is disposed between the second auxiliary fixing member and the fixing member.

6. The motor assembly according to claim 1, wherein the motor includes a flange portion formed to be coupled to the vibration absorbing member.

7. The motor assembly according to claim 6, wherein the flange portion is disposed at an upper peripheral portion of the motor.

8. The motor assembly according to claim 1, wherein the fixing member includes a shaft hole to receive a rotation shaft of the motor.

9. The motor assembly according to claim 1, wherein the fixing member includes a gear fixing portion formed to rotatably fix a gear which is gear coupled to a rotation shaft of the motor.

10. A motor fixing structure, comprising:

a motor;

a fixing member to fix the motor in position; and a vibration absorbing member to prevent vibration of the motor from being transferred to the fixing member, wherein the vibration absorbing member is formed to be longer by a predetermined length than the height of the motor, and wherein the vibration absorbing member includes a fastening hole through the length of the vibration absorbing member to couple screws, and a reinforcing member is inserted into the fastening hole to reinforce a clamping force of the vibration absorbing member.

11. The motor fixing structure according to claim 10, wherein the vibration absorbing member has a length longer than a predetermined spacing distance between the motor and the fixing member.

12. The motor fixing structure according to claim 10, wherein the vibration absorbing member is screw coupled to the motor through the fastening hole at one side of the vibration absorbing member and is screw coupled to the fixing member through the fastening hole at the opposite side of the vibration absorbing member.

* * * * *